（12) United States Patent
Yoshizawa et al.

(10) Patent No.: US 6,278,230 B1
(45) Date of Patent: Aug. 21, 2001

(54) ELECTRON EMISSION DEVICE AND DISPLAY DEVICE USING THE SAME

(75) Inventors: Atsushi Yoshizawa; Kiyohide Ogasawara; Takamasa Yoshikawa; Takashi Chuman; Nobuyasu Negishi; Shingo Iwasaki; Hiroshi Ito; Takashi Yamada; Shuuichi Yanagisawa; Kazuto Sakemura, all of Tsurugashima (JP)

(73) Assignee: Pioneer Electronic Corporation, Tokyo (JP)

( * ) Notice: Subject to any disclaimer, the term of this patent is extended or adjusted under 35 U.S.C. 154(b) by 0 days.

(21) Appl. No.: 09/131,225

(22) Filed: Aug. 7, 1998

(30) Foreign Application Priority Data

Aug. 8, 1997 (JP) ..................................................... 9-215136

(51) Int. Cl.[7] .............................. H01J 19/24; H01J 1/316; H01J 1/30
(52) U.S. Cl. ............................ 313/310; 313/311; 313/491
(58) Field of Search ................................... 313/309, 310, 313/491, 351, 336, 495, 496, 497, 422, 311; 257/10

(56) References Cited

U.S. PATENT DOCUMENTS

| | | | | |
|---|---|---|---|---|
| 5,063,327 | * | 11/1991 | Brodie et al. | 313/495 |
| 5,729,094 | * | 3/1998 | Geis et al. | 313/496 |
| 5,936,257 | * | 8/1999 | Kusunoki et al. | 257/10 |

FOREIGN PATENT DOCUMENTS 7-65710   3/1995   (JP) ................... H01J/9/02

* cited by examiner

Primary Examiner—Michael H. Day
(74) Attorney, Agent, or Firm—Morgan, Lewis & Bockius LLP (57) ABSTRACT

An electron emission device exhibits a high electron emission efficiency. The device includes an electron-supply layer of metal or semiconductor, an insulator layer formed on the electron-supply layer, and a thin-film metal electrode formed on the insulator layer. The insulator layer has a film thickness of 50 nm or greater. The electron-supply layer has a film thickness of 2.5 μm or greater. When an electric field is applied between the electron-supply layer and the thin-film metal electrode, the electron emission device emits electrons.

2 Claims, 6 Drawing Sheets

ELECTRON EMISSION DEVICE AND DISPLAY DEVICE USING THE SAME

BACKGROUND OF THE INVENTION

1. Field of the Invention

The present invention relates to an electron emission device and an electron emission display device using the same.

2. Description of the Related Art

In field electron emission display apparatuses, a Field Emission Display (FED) is known as a planar emission display a device equipped with an array of cold-cathode electron emission source which does not require cathode heating. The emission principle of, for example, an FED using Spindt-type cold cathodes of minute protrusions is as follows: Its emission principle is like a Cathode Ray Tube (CRT), although this FED has a cathode array of Spindt-type protrusions which is different from that of CRT. In the FED, electrons are drawn into a vacuum space by means of each gate electrode spaced apart from the Spindt-type cathode, and the electrons are made to impinge upon the fluorescent substance that is coated on a transparent anode, thereby causing light emission.

This FED, however, has a problem of low production yield because the manufacture of the minute Spindt-type emitter arrays as a cold cathode is complex and involves many processes.

There also exists an electron emission device with a metal-insulator-metal (MIM) structure as a planar electron emission source. The electron emission device with the MIM structure comprises an Al underlayer as a base electrode, an $Al_2O_3$ insulator layer with about 10 nm thickness, and an Au overlayer, as a top electrode with about 10 nm thickness which are formed in order on the substrate. In the case that this MIM device is placed under an opposing electrode in a vacuum, when a voltage is applied between the Al underlayer and the Au overlayer and, at the same time, an acceleration voltage is applied to the opposing electrode, then some of electrons emit out of the Au overlayer and reach the opposing electrode. Even the electron emission device with the MIM structure does not yet provide a sufficient amount of emitted electrons.

To improve these disadvantages of emission of the MIM device, it is conventionally considered that there is a necessity to make the $Al_2O_3$ insulator layer thinner by about several nanometers and make the $Al_2O_3$ insulator layer with a uniform quality so that the interface between the $Al_2O_3$ insulator layer and the Au overlayer is more uniform.

To provide a thinner and more uniform insulator layer, for example, an attempt has been made to control the anodized current by using an anodization method thereby to improve the electron emission characteristics, as in the invention described in Japanese Patent Application kokai No. Hei 7-65710.

However, even an electron emission device with the MIM structure which is manufactured by this anodization method ensures an emission current of about $1\times10^{-5}$ A/cm$^2$ and an electron emission efficiency of about $1\times10^{-3}$.

OBJECTS AND SUMMARY OF THE INVENTION

Accordingly, it is an object of the present invention to provide an electron emission device with a high electron emission efficiency and an electron emission display apparatus using the same.

In consideration to a universal application of this electron emission device, the usage of silicon (Si) for an electron-supply layer in the electron emission device is effective to improve the stability of electron emission in the device and also the use of an amorphous silicon (a-Si) layer deposited by a sputtering method is effective in a high productivity and therefore is very effective. Accordingly, it is another object of the present invention to provide an electron emission device with a high stability and an electron emission display apparatus using the same.

In order to overcome the foregoing and other problems, the object of the invention are realized by an electron emission device in accordance with embodiments of this invention, wherein the device according to the invention comprises:

an electron-supply layer made of metal or semiconductor;

an insulator layer formed on the electron-supply layer; and a thin-film metal electrode formed on the insulator layer and facing a vacuum space, characterized in that said insulator layer has a film thickness of 50 nm or greater, and said electron-supply layer has a film thickness of 2.5 μm or greater, whereby the electron emission device emits electrons when an electric field is applied between the electron-supply layer and the thin-film metal.

Moreover a display device using an electron emission device according to the invention comprises:

a pair of first and second substrates facing each other with a vacuum space in between;

a plurality of electron emission devices provided on the first substrate;

a collector electrode provided on the second substrate; and a fluorescent layer formed on the collector electrode, each of the electron emission devices comprising an electron-supply layer of metal or semiconductor; an insulator layer formed on the electron-supply layer; and a thin-film metal electrode formed on the insulator layer and facing a vacuum space, wherein said insulator layer has a film thickness of 50 nm or greater, and said electron-supply layer has a film thickness of 2.5 μm or greater.

According to the electron emission device of the invention with the above structure, through-bores are not likely to be produced in the insulator layer because of its relatively thick thickness and then the production yield is improved.

The electron emission device of the invention is a planar or spot-like electron emission diode and can be adapted to high speed devices such as a source of a pixel vacuum tube or bulb, an electron emission source of a scanning or transmission electron microscope, a vacuum-micro electronics device and the like. In addition, this electron emission device can serve as a minute microwave tube or a diode which emits electromagnetic waves with millimeter or sub-millimeter wavelength, and also can serve as a high speed switching device.

DETAILED DESCRIPTION OF THE PREFERRED EMBODIMENTS

Preferred embodiments according to the present invention will be described in more detail with reference to the accompanying drawings.

Figure 1:
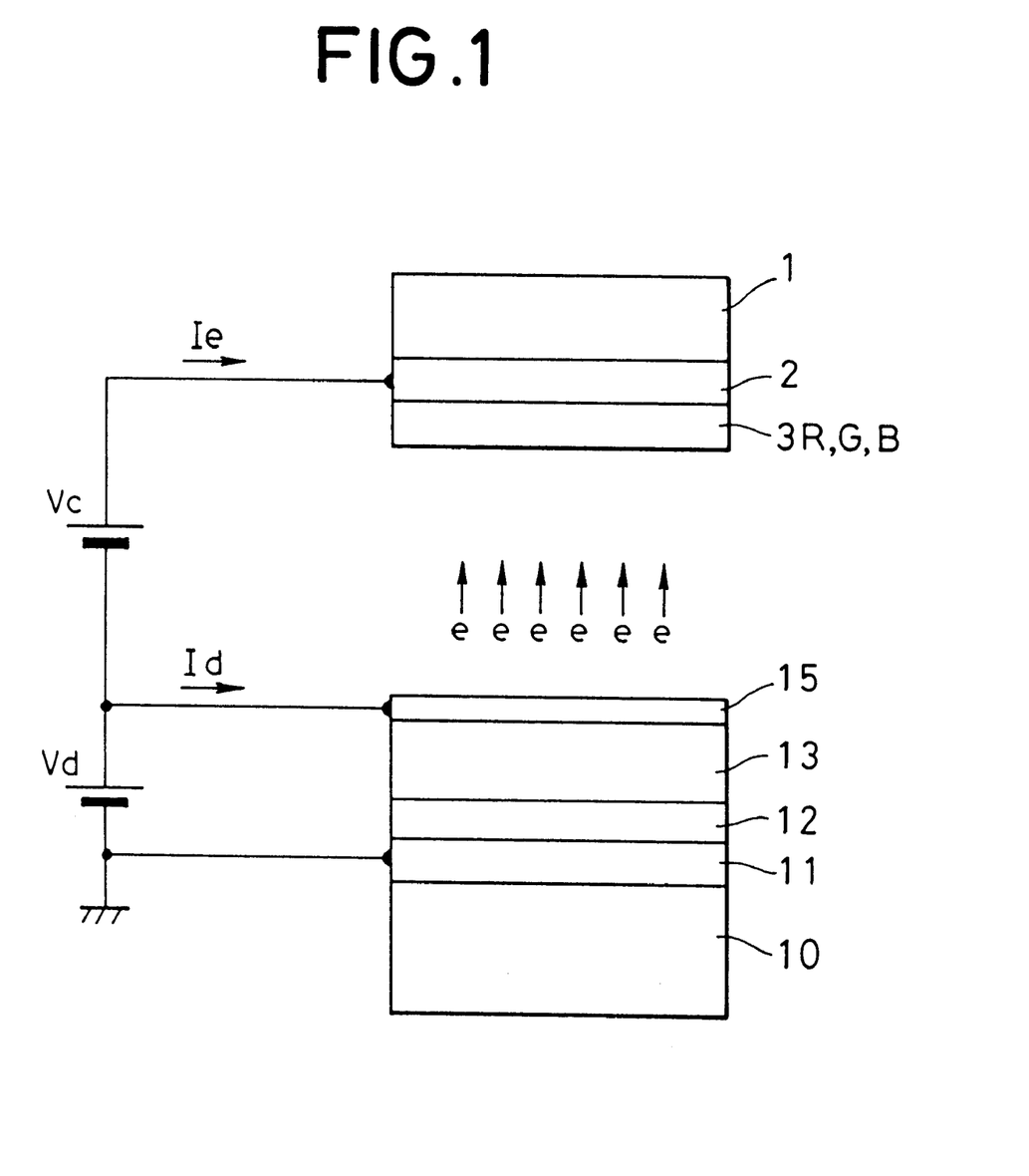
FIG. 1 is a schematic cross-sectional view of an electron emission device according to the invention.

As shown in FIG. 1, an electron emission device embodying the invention has an electron-supply layer 12 of silicon (Si), an insulator layer 13 of silicon dioxide ($SiO_2$) and a thin-film metal electrode 15 of gold (Au) facing a vacuum space which are layered or formed in turn on an electrode surface of a device substrate 10 of glass on which an ohmic electrode 11 of tungsten (W) is previously formed. Particularly, the electron-supply layer 12 of amorphous silicon (a-Si) is deposited with a thickness of 2.5 $\mu$m or greater. The electron emission device emits electrons when an electric field is applied between the electron-supply layer and the thin-film metal electrode. The insulator layer 13 is deposited in relatively thicker thicknesses so as to have a thickness of 50 nm or greater. A second substrate 1 is fixed to the first substrate 10 so as to sandwich a vacuum space therebetween. Ceramics such as $Al_2O_3$, $Si_3N_4$ and BN etc. may be used for the material of the device substrate 10 instead of glass.

This electron emission device can be regarded as a diode of which the thin-film metal electrode 15 at its surface is connected to a positive applied voltage Vd and the back i.e., ohmic electrode 11 is connected to a ground potential. When the voltage Vd e.g., 90V is applied between the ohmic electrode 11 and the thin-film metal electrode 15 to supply electrons into the electron-supply layer 12, a diode current Id flows. Since the insulator layer 13 has a high resistance, most of the applied electric field is applied to the insulator layer 13. The electrons travel in the conduction band in the insulator layer 13 toward the thin-film metal electrode 15. Some of the electrons that reach near the thin-film metal electrode 15 tunnel through the thin-film metal electrode 15, due to the strong electric field, to be emitted out into the vacuum space.

The electrons e (emission current Ie) discharged from the thin-film metal electrode 15 by the tunnel effect are soon accelerated by a high voltage Vc, which is applied to an opposing collector electrode (transparent electrode) 2, and is collected at the collector electrode 2. If a fluorescent substance is coated on the collector electrode 2, corresponding visible light is observed.

While Si is particularly effective as a material for the electron-supply layer 12 of the electron emission device, an elemental semiconductor or a compound semiconductor of an element of a group IV, a group III-V, a group II-VI or the like, such as a germanium (Ge), germanium silicon compound (Ge-Si), siliconcarbide (SiC), galliumarsenide (GaAs), indiumphosphide (InP), or cadmium selenide (CdSe) or $CuInTe_2$ can be used as well.

While metals for the electron-supply layer 12 such as Al, Au, Ag and Cu are effective as the electron supplying material, Sc, Ti, V, Cr, Mn, Fe, Co, Ni, Zn, Ga, Y, Zr, Nb, Mo, Tc, Ru, Rh, Pd, Cd, Ln, Sn, Ta, W, Re, Os, Ir, Pt, Tl, Pb, La, Ce, Pr, Nd, Pm, Sm, Eu, Gd, Tb, Dy, Ho, Er, Tm, Yb, Lu, and the like can be used as well.

Silicon oxide $SiO_x$ (wherein subscribed x represents an atomic ratio) is effective as the dielectric material of the insulator layer 13 and, metal oxides or metal nitrides such as LiOx, LiNx, NaOx, KOx, RbOx, CsOx, BeOx, MgOx, MgNx, CaOx, CaNx, SrOx, BaOx, ScOx, YOx, YNx, LaOx, LaNx, CeOx, PrOx, NdOx, SmOx, EuOx, GdOx, TbOx, DyOx, HoOx, ErOx, TmOx, YbOx, LuOx, TiOx, TiNx, ZrOx, ZrNx, HfOx, HfNx, ThOx, VOx, VNx, NbOx, TaOx, TaNx, CrOx, CrNx, MoOx, MoNx, WOx, WNx, MnOx, ReOx, FeOx, FeNx, RuOxx, OsOx, CoOx, RhOx, IrOx, NiOx, PdOx, PtOx, CuOx, CuNx, AgOx, AuOx, ZnOx, CdOx, HgOx, BOx, BNx, AlOx, AlNx, GaOx, GaNx, InOx, SiNx, GeOx, SnOx, PbOx, POx, PNx, AsOx, SbOx, SeOx, TeOx and the like can be used as well. Furthermore, metal complex oxides such $LiAlO_2$, $Li_2SiO_3$, $Li_2TiO_3$, $Na_2Al_{22}O_{34}$, $NaFeO_2$, $Na_4SiO_4$, $K_2SiO_3$, $K_2TiO_3$, $K_2WO_4$, $Rb_2CrO_4$, $Cs_2CrO_4$, $MgAl_2O_4$, $MgFe_2O_4$, $MgTiO_3$, $CaTiO_3$, $CaWO_4$, $CaZrO_3$, $SrFe_{12}O_{19}$, $SrTiO_3$, $SrZrO_3$, $BaAl_2O_4$, $BaFe_{12}O_{19}$, $BaTiO_3$, $Y_3Al_5O_{12}$, $Y_3Fe_5O_{12}$, $LaFeO_3$, $La_3Fe_5O_{12}$, $La_2Ti_2O_7$, $CeSnO_4$, $CeTiO_4$, $Sm_3Fe_5O_{12}$, $EuFeO_3$, $Eu_3Fe_5O_{12}$, $GdFeO_3$, $Gd_3Fe_5O_{12}$, $DyFeO_3$, $Dy_3Fe_5O_{12}$, $HoFeO_3$, $Ho_3Fe_5O_{12}$, $ErFeO_3$, $Er_3Fe_5O_{12}$, $Tm_3Fe_5O_{12}$, $LuFeO_3$, $Lu_3Fe_5O_{12}$, $NiTiO_3$, $Al_2TiO_3$, $FeTiO_3$, $BaZrO_3$, $LiZrO_3$, $MgZrO_3$, $HfTiO_4$, $NH_4VO_3$, $AgVO_3$, $LiVO_3$, $BaNb_2O_6$, $NaNbO_3$, $SrNb_2O_6$, $KTaO_3$, $NaTaO_3$, $SrTa_2O_6$, $CuCr_2O_4$, $Ag_2CrO_4$, $BaCrO_4$, $K_2MoO_4$, $Na_2MoO_4$, $NiMoO_4$, $BaWO_4$, $Na_2WO_4$, $SrWO_4$, $MnCr_2O_4$, $MnFe_2O_4$, $MnTiO_3$, $MnWO_4$, $CoFe_2O_4$, $ZnFe_2O_4$, $FeWO_4$, $CoMoO_4$, $CoTiO_3$, $CoWO_4$, $NiFe_2O_4$, $NiWO_4$, $CuFe_2O_4$, $CuMoO_4$, $CuTiO_3$, $CuWO_4$, $Ag_2MoO_4$, $Ag_2WO_4$, $ZnAl_2O_4$, $ZnMoO_4$, $ZnWO_4$, $CdSnO_3$, $CdTiO_3$, $CdMoO_4$, $CdWO_4$, $NaAlO_2$, $MgAl_2O_4$, $SrAl_2O_4$, $Gd_3Ga_5O_{12}$, $InFeO_3$, $MgIn_2O_4$, $Al_2TiO_5$, $FeTiO_3$, $MgTiO_3$, $NaSiO_3$, $CaSiO_3$, $ZrSiO_4$, $K_2GeO_3$, $Li_2GeO_3$, $Na_2GeO_3$, $Bi_2Sn_3O_9$, $MgSnO_3$, $SrSnO_3$, $PbSiO_3$, $PbMoO_4$, $PbTiO_3$, $SnO_2$—$Sb_2O_3$, $CuSeO_4$, $Na_2SeO_3$, $ZnSeO_3$, $K_2TeO_3$, $K_2TeO_4$, $Na_2TeO_3$, $Na_2TeO_4$ and the like can be used as well and still furthermore, sulfides such as FeS, $Al_2S_3$, MgS, ZnS and the like, fluorides such as LiF, $MgF_2$, $SmF_3$ and the like, chlorides such as HgCl, $FeCl_2$, $CrCl_3$ and the like, bromides such as AgBr, CuBr, $MnBr_2$ and the like, iodide such as $PbI_2$, CuI, $FeI_2$ and the like and metal oxidized nitrides such as SiAlON and the like can be used as well for the insulator layer.

Moreover, carbon such as diamond, Fullerene ($C_{2n}$) and the like or metal carbide such as $Al_4C_3$, $B_4C$, $CaC_2$, $Cr_3C_2$, $MO_2C$, MoC, NbC, SiC, TaC, TiC, VC, $W_2C$, WC, ZrC and the like are also effective as the dielectric material of the insulator layer 13. Fullerene ($C_{2n}$) consists of carbon atoms. The representative $C_{60}$ is a spherical surface basket molecule as known a soccer ball molecule. There is also known $C_{32}$ to $C_{960}$ and the like. The subscribed x in $O_x$, $N_x$ and the like in the above chemical formulas represent atomic ratios and also herein after.

The film thickness of the insulator layer 13 may be 50 nm or greater preferably in ranging from 100 to 1000 nm.

Metals Pt, Au, W, Ru and Ir are effective as the material for the thin-film metal electrode 15 on the electron emission side. In addition, Al, Sc, Ti, V, Cr, Mn, Fe, Co, Ni, Cu, Zn, Ga, Y, Zr, Nb, Mo, Tc, Rh, Pd, Ag, Cd, Ln, Sn, Ta, Re, Os, Tl, Pb, La, Ce, Pr, Nd, Pm, Sm, Eu, Gd, Tb, Dy, Ho, Er, Tm, Yb, Lu and the like can be used as well for the thin-film metal electrode.

The material for the device substrate 10 may be ceramics such as $Al_2O_3$, $Si_3N_4$ or BN instead of glass.

Although sputtering is particularly effective in the fabrication of those layers and the substrate, vacuum deposition, CVD (Chemical Vapor Deposition), laser ablation, MBE (Molecular Beam Epitaxy) and ion beam sputtering are also effective.

Electron emission devices according to the invention were fabricated as first embodiments and their characteristics were examined concretely.

Various electron-supply layers of a-Si with thicknesses 0 $\mu$m (non electron-supply layer), 2.5 $\mu$m, 5.0 $\mu$m, 7.5 $\mu$m, and 10.0 $\mu$m were deposited by sputtering, on electrode surfaces of device substrates 10 of glass respectively on each of which an ohmic electrode of W was previously deposited with thickness of 300 nm by sputtering. A plurality of preliminary substrates of this type were prepared.

Then, insulator layers of $SiO_x$ were deposited on the electron-supply layers of the preliminary substrates by sputtering respectively while changing the film thickness thereof in a 50 nm, 400 nm and 1000 nm. Thus a plurality of second preliminary substrates were provided. Each $SiO_x$ insulator layer was deposited by sputtering by using a gas of Ar, Kr or xe or a mixture thereof, or a gas mixture essentially consisting of one of those rare gases with $O_2$, $N_2$ or the like mixed therein, under the sputtering conditions of a gas pressure of 0.1 to 100 mTorr, preferably 0.1 to 20 mTorr and the depositing rate of 0.1 to 1000 nm/min, preferably 0.5 to 100 nm/min.

Finally, a thin-film metal electrode of Pt was deposited with thick of 10 nm on the surface of the amorphous $SiO_x$ layer of each substrate by sputtering, thus providing plural device substrates.

Meanwhile, transparent substrates were prepared, each of which has an ITO collector electrode 2 formed inside a transparent glass substrate and has a fluorescent layer 3 of a fluorescent substance corresponding to R, G or B color emission formed on the collector electrode by the normal scheme.

Electron emission devices were assembled in each of which the device substrate and the transparent substrate are supported apart from one another by 10 mm in parallel by a spacer in such a way that the thin-film metal electrode 15 faced the collector electrode 2, with the clearance therebetween made to a vacuum of $10^{-7}$ Torr or $10^{-5}$ Pa.

Then, the diode current Id and the emission current Ie of the acquired plural devices corresponding to the thicknesses 50 nm, 400 nm and 1000 nm of the insulator layer were measured while a driving voltage Vd of 0 to 200 V was applied to the prepared electron emission devices.

Figure 2:
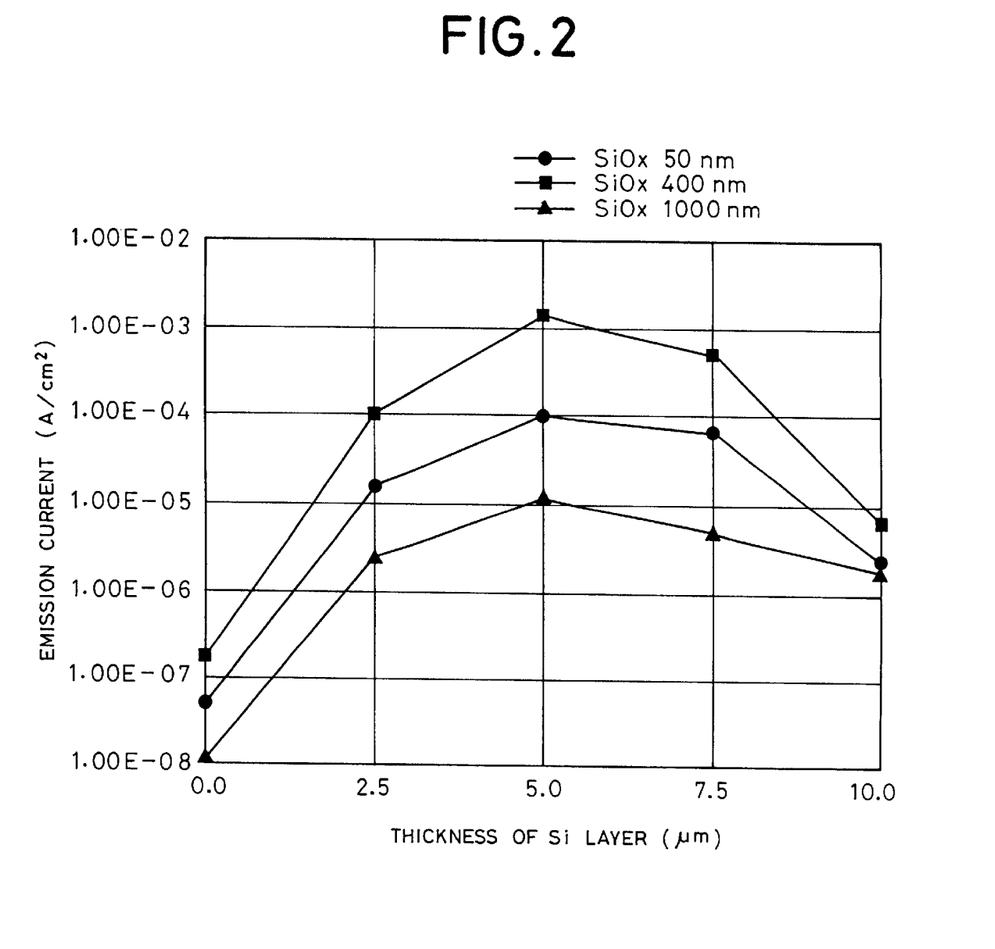
FIG. 2 is a graph showing a relationship between the electron emission current and the film thickness of the electron-supply layer in the electron emission device according to the invention.
Figure 3:
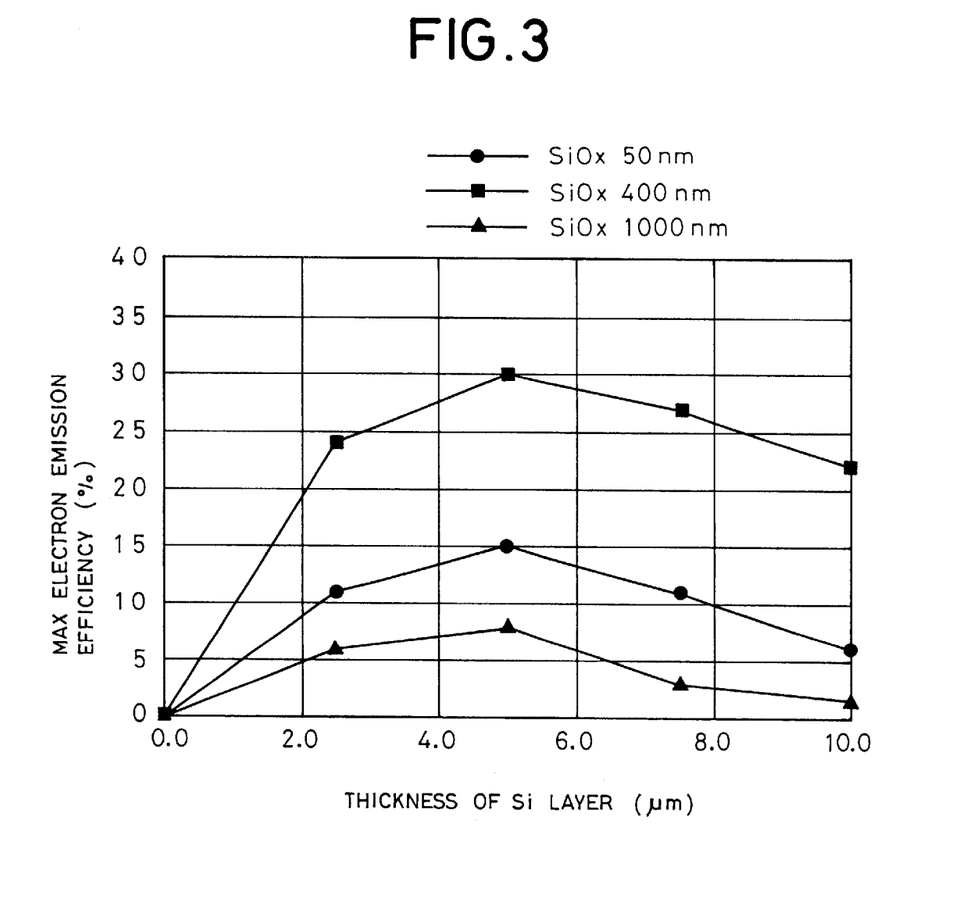
FIG. 3 is a graph showing a relationship between the electron emission efficiency and the film thickness of the electron-supply layer in the electron emission device according to the invention.

FIG. 2 shows the resultant showing a relationship between the film thickness of the Si electron-supply layer and the maximum emission current Ie for film thicknesses 50 nm, 400 nm and 1000 nm of the $SiO_x$ insulator layers. FIG. 3 shows the resultant showing a relationship between the film thickness of the Si electron-supply layer and the maximum electron emission efficiency (Ie/Id) for film thicknesses 50 nm, 400 nm and 1000 nm of the $SiO_x$ insulator layers. As apparent from FIGS. 2 and 3, emission current of about $1 \times 10^{-6}$ A/cm$^2$ or more is obtained in every device having the insulator one of thicknesses 50 mn, 400 nm or 1000 nm under the condition that the Si electron-supply layer has a thickness of 2.5 $\mu$m or greater. The maximum electron emission efficiency (Ie/Id) are obtained from 2% to 30% at max.

It is understood from those results that the electron-supply layer having a thickness of 2.5 $\mu$m or greater is effective for the electron emission device comprising; the electron-supply layer made of metal or semiconductor; the insulator layer with a 50 nm thickness or greater; and the thin-film metal electrode facing a vacuum space, so that the electron emission device emits electrons when applying a voltage across the electron-supply layer and the thin-film metal electrode.

Furthermore, other electron emission devices according to the invention were fabricated as second embodiments with various thicknesses of the thin-film metal electrodes and their characteristics were examined concretely. In this case, the devices were manufactured through the same manner as the above first embodiments except that the electron-supply layer of 300 nm thick W and the insulator layers of $SiO_x$ having a 400 nm thickness were deposited while the thin-film metal electrodes were formed of Au at thicknesses of 2 nm, 5 nm, 10 nm, 15 nm, 50 nm, 100 nm, and 200 nm respectively. All of fabricated devices each having the insulator with one of thicknesses 50 nm, 400 nm and 1000 nm were measured and compared with respect to the diode current Id and the emission current Ie.

Figure 4:
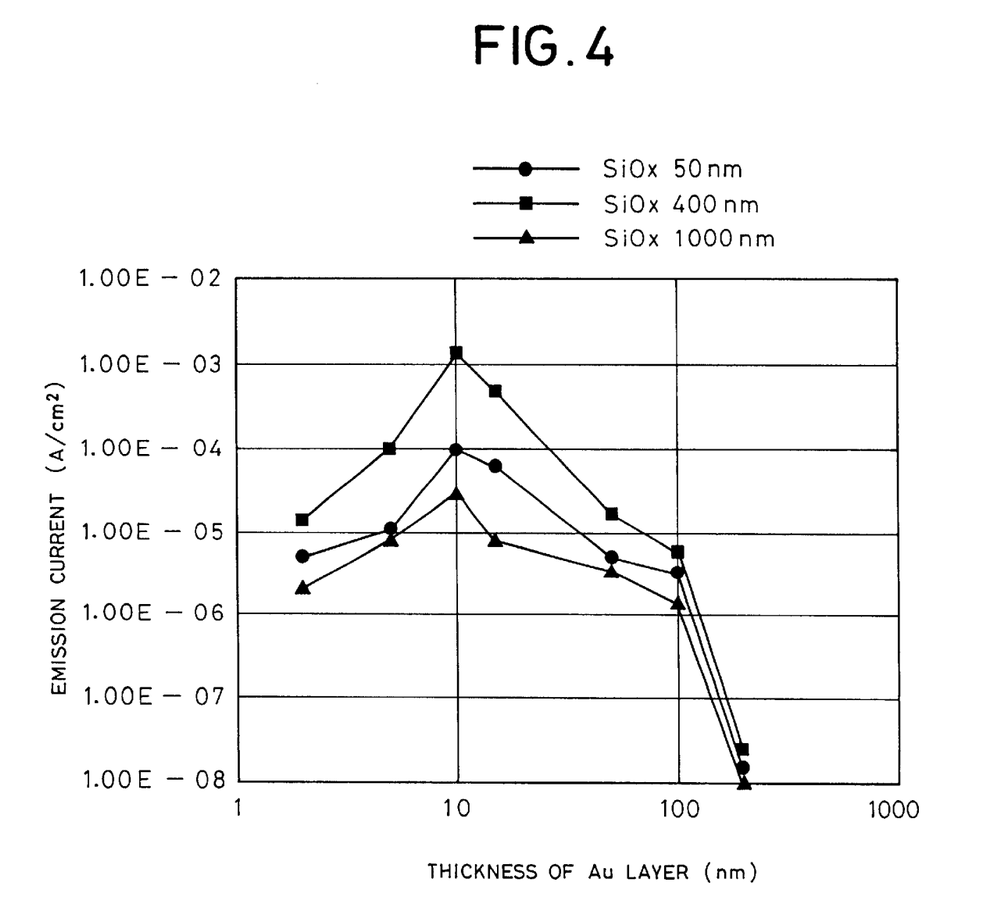
FIG. 4 is a graph showing a relationship between the electron emission current and the film thickness of the thin-film metal electrode in the electron emission device according to the invention.

FIG. 4 shows the resultant relationship between the film thickness of the Au thin-film metal electrode and the maximum emission current Ie for film thicknesses 50 nm, 400 nm and 1000 nm of the $SiO_x$ insulator layers. As apparent from FIG. 4, the emission current of about $1 \times 10^{-6}$ A/cm$^2$ or more is obtained in every device having the insulator with one of thicknesses 50 nm, 400 nm or 1000 nm under the condition that the Au thin-film metal electrode has a 100 nm thickness or less. It is understood from those results that the thickness of the Au thin-film metal electrode of a 100 nm thickness or less is effective for occurrence of a actual usage level of the emission current.

It is therefore found out that a good result is obtained from the device having the insulator layer with a 50 nm thickness or greater; the electron-supply layer with a 2.5 $\mu$m thickness or greater; and the thin-film metal electrode with a 100 nm thickness or less.

Figure 5:
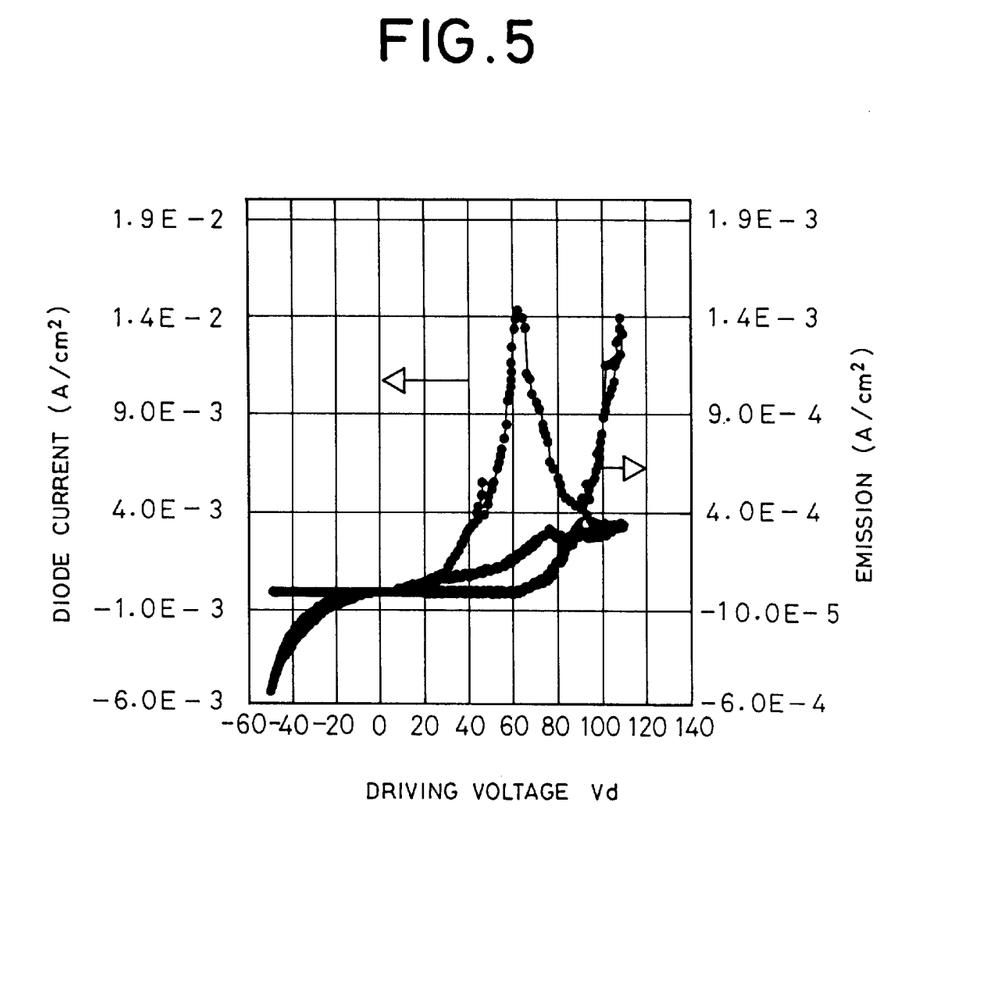
FIG. 5 is a graph illustrating a relationship of a Diode current Id and the Emission current Ie with respect to the Driving voltage Vd of the electron emission device of an embodiment according to the invention.

FIG. 5 shows a property relationship of a Diode current Id and the Emission current Ie with respect to the Driving voltage Vd of the electron emission device comprising the Al ohmic electrode with a 300 nm thickness; the Si electron-supply layer with a 5 $\mu$m thickness; the $SiO_x$ insulator layer with a 400 nm thickness; and the Au thin-film metal electrode with a 10 nm thickness. As seen from FIG. 5, it is understood that the diode current Id shows a hysteresis property. In the Figure, a voltage drop of diode current Id occurs at the starting point of the emission current Ie and then the emission current Ie rises.

With a voltage of approximately 4 kV applied between the fluorescent-substance coated collector electrode and the thin-film metal electrode of one embodiment of the above devices whose insulator layers have thicknesses of 50 nm or greater, a uniform fluorescent pattern corresponding to the shape of the thin-film metal electrode was observed. This indicates that the electron emission from the amorphous $SiO_x$ layer is uniform and has a high linear movement, and that those devices can serve as an electron emission diode, or a light-emitting diode or a laser diode which emits electromagnetic waves with millimeter or sub-millimeter wavelength and also a high speed switching device.

By a scanning electron microscope (SEM), there were observations of the surface of the $SiO_x$ insulator layer resulted from the sputtering during the above deposition process, microstructures composed of grain surface each having about 20 nm diameter appeared. The microstructures composed of grain structure of $SiO_x$ of the insulator layer seems to cause the peculiar phenomena that the tunnel current flows through the insulator layer which has a thickness of 50 nm or greater. While $SiO_x$ is an insulator by nature, multiple bands with low potentials are caused by the occurrence of defects adjacent thereto or impurities in the forbidden band of the insulator layer. It is assumed that electrons tunnel-pass through multiple bands with the low-potential one after another, and thus pass through the insulator layer of 50 nm or greater in thickness as a consequence.

Figure 6:
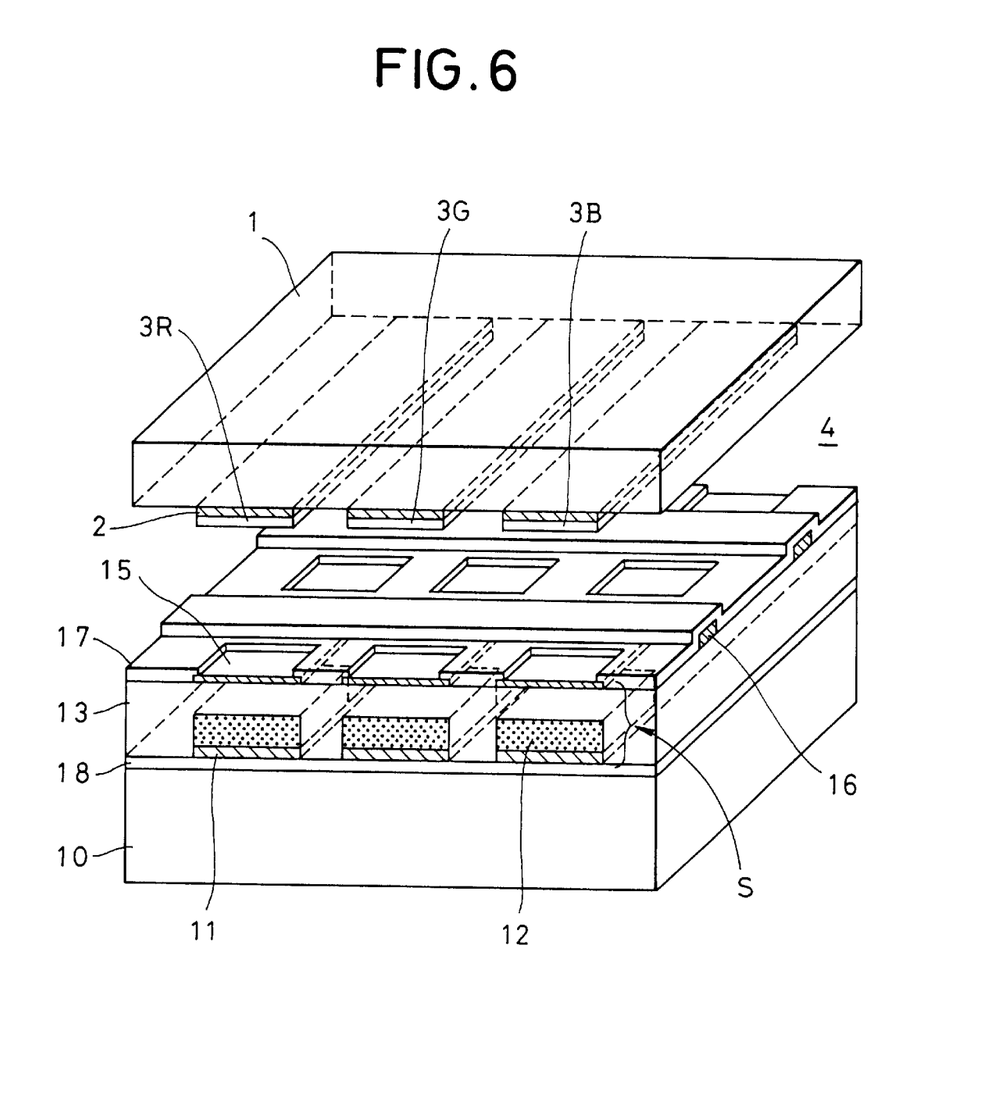
FIG. 6 is a schematic perspective view showing an electron emission display device according to one embodiment of the invention.

FIG. 6 shows an electron emission display device according to one embodiment of the invention. This embodiment comprises a pair of the transparent substrate 1 and the device substrate 10, which face each other with a vacuum space 4 in between. In the illustrated electron emission display apparatus, a plurality of transparent collector electrodes 2 of, for example, an indium tin oxide (so-called ITO), tin oxide (SnO), zinc oxide (ZnO) or the like, are formed in parallel on the inner surface of the transparent glass substrate 1 or the display surface (which faces the back substrate 10). The collector electrodes 2 may be formed integrally. The transparent collector electrodes which trap emitted electrons are arranged in groups of three in association with red (R), green (G) and blue (B) color signals in order to provide a color display panel, and voltages are applied to those three collector electrodes respectively. Therefore, fluorescent layers 3R, 3G and 3B of fluorescent substances corresponding to R, G and B color emissions are respectively formed on the three collector electrodes 2 in such a way as to face the vacuum space 4.

A plurality of ohmic electrodes 11 are formed in parallel on the inner surface of the device substrate 10 of glass or the like which faces the transparent glass substrate 1 with the vacuum space 4 in between (i.e., said inner surface faces the transparent glass substrate 1) via an auxiliary insulator layer 18. The auxiliary insulator layer 18 is comprised of an insulator such as $SiO_2$, $SiN_x$, $Al_2O_3$ or AlN, and serves to prevent an adverse influence of the device substrate 10 on the device (such as elution of an impurity such as an alkaline component or a roughened substrate surface). A plurality of electron emission devices S are formed on the ohmic electrodes 11. In order that adjoining thin-film metal electrodes 15 are electrically connected to each other, a plurality of bus electrodes 16 are formed on parts of the thin-film metal electrodes 15, extending in parallel to one another and perpendicular to the ohmic electrodes 11. Each electron emission device S comprises the electron-supply layer 12 of amorphous silicon at a 2.5 μm thick, the insulator layer 13 and the thin-film metal electrode 15 which are formed in order on the associated ohmic electrode 11.

The thin-film metal electrodes 15 face the vacuum space 4. A second auxiliary insulator layer 17 with openings is formed to separate the surfaces of the thin-film metal electrodes 15 into a plurality of electron emission regions. This second auxiliary insulator layer 17 covers the bus electrodes 16 to prevent unnecessary short-circuiting.

The material for the ohmic electrodes 11 is Au, Pt, Al, W or the like which is generally used for the wires of an IC, and has a uniform thickness for supplying substantially the same current to the individual devices.

While silicon (Si) is one material for the, electron-supply layer 12, it is not restrictive for the electron-supply layer of the invention and other semiconductors or metals of any of amorphous, polycrystal and monocrystal can be used as well.

From the principle of electron emission, it is better that the material for the thin-film metal electrode 15 has a lower work function ø and is thinner. To increase the electron emission efficiency, the material for the thin-film metal electrode 15 should be a metal of the group I or group II in the periodic table; for example, Mg, Ba, Ca, Cs, Rb, Li, Sr, and the like are effective and alloys of those elements may be used as well. To make the thin-film metal electrode 15 very thin, the material for the thin-film metal electrode 15 should be chemically stable with a high conductivity; for example, single substances of Au, Pt, Lu, Ag and Cu or alloys thereof are desirable. It is effective to coat or dope a metal with a low work function as described above on or in those metals.

The material for the bus electrodes 16 can be Au, Pt, Al or the like which is generally used for the wiring of an integrated circuit IC, and should have a thickness enough to supply substantially the same potential to the individual devices, adequately of 0.1 to 50 μm.

A simple matrix system or an active matrix system may be employed as the driving system for the display device of the invention.

What is claimed is:

1. An electron emission device comprising:
   a substrate layer;
   an electrode formed on the substrate layer;
   an electron-supply layer made of metal or semiconductor formed on the electrode;
   an insulator layer formed on the electron-supply layer; and
   a thin-film metal electrode formed on the insulator layer and facing a vacuum space,
       wherein said insulator layer has a film thickness of 50 nm or greater, and said electron-supply layer has a film thickness of 2.5 μm or greater, whereby the electron emission device emits electrons when an electric field is applied between the electron-supply layer and the thin-film metal electrode.

2. An electron emission display device comprising:
   a pair of first and second substrates facing each other with a vacuum space in between;
   a plurality of electron emission devices provided on the first substrate;
   a collector electrode provided on the second substrate; and
   a fluorescent layer formed on the collector electrode,
   each of the electron emission devices comprising an electron-supply layer of metal or semiconductor; an electrode associated with the electron-supply layer and located between the electron-supply layer and the first substrate; an insulator layer formed on the electron-supply layer; and a thin-film metal electrode formed on the insulator layer and facing a vacuum space, wherein said insulator layer has a film thickness of 50 nm or greater, and said electron-supply layer has a film thickness of 2.5 μm or greater.

* * * * *